(12) United States Patent
Arai et al.

(10) Patent No.: US 6,778,595 B1
(45) Date of Patent: Aug. 17, 2004

(54) ADSL MODEM

(75) Inventors: Yasuhiro Arai, Kawasaki (JP); Kumiko Maruo, Kawasaki (JP); Masato Hori, Kawasaki (JP); Takashi Sasaki, Kawasaki (JP); Akira Oshima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 835 days.

(21) Appl. No.: 09/641,124

(22) Filed: Aug. 16, 2000

(30) Foreign Application Priority Data

Oct. 29, 1999 (JP) .............................. 11-309996

(51) Int. Cl.[7] .............................................. H04M 11/00
(52) U.S. Cl. ................................. 375/222; 379/93.32
(58) Field of Search ............................ 375/222, 219, 375/220; 370/445, 449; 379/93.32

(56) References Cited

U.S. PATENT DOCUMENTS 5,222,106 A  6/1993 Satoh et al.
5,781,728 A  7/1998 Rybicki et al.
6,381,213 B1 * 4/2002 Webber et al. ............... 370/213
6,396,912 B1 * 5/2002 Mueller et al. .......... 379/93.32

FOREIGN PATENT DOCUMENTS

EP      0 812 087 A2   12/1997
EP      0 820 168 A2    1/1998
JP      10-303872      11/1998

* cited by examiner

Primary Examiner—Stephen Chin
Assistant Examiner—Kevin Kim
(74) Attorney, Agent, or Firm—Katten Muchin; Zavis Rosenman

(57) ABSTRACT

An ADSL modem connected to the telephone line is disclosed, which even in the case where a plurality of ADSL modems are connected to a single telephone line installed in a SOHO application or in the home of an ordinary user, a stable high-speed data communication can be realized without superposing the signals between the ADSL models or without causing any impedance mismatch. An ADSL band signal detector (11) detects whether the ADSL frequency band is occupied by another ADSL modem connected to the telephone line or not. Upon detection that the ADSL frequency is so occupied, a control unit (12, 13) suppresses the application of the signal energy to the ADSL frequency band.

10 Claims, 6 Drawing Sheets

ADSL MODEM

BACKGROUND OF THE INVENTION

1. Field of the Invention

The present invention relates to an ADSL (Asymmetric Digital Subscriber Line) modem capable of realizing stable high-speed data communication without signal superposition between ADSL modems or impedance mismatching even in the case where a plurality of ADSL modems are connected to a single telephone line. An ADSL modem may alternatively be referred to as an ADSL transceiver.

2. Description of the Related Art

A conventional ADSL modem is used in a system configuration for point-to-point connection. In SOHO (Small office & Home Office) applications, for example, the DSLAM (Digital Subscriber Line Access Multiplexer) in a switching office and an ADSL router in a business office or a user are connected point-to-point to each other although a multipoint connection, using a LAN, is used within the office or the user's home.

The current trend toward the ADSL modem being built in personal computers, however, tends to lead to a situation in which the ADSL modem is combined or built in with a standard analog modem built in the personal computer. In other words, the analog modem and the ADSL modem are often formed on a single board or within a single module. As a result, a personal computer having an analog modem and an ADSL modem built therein is connected to a single telephone line cable.

Further, the extension of the internet has given rise to many cases in which the user connects a plurality of personal computers (including a built-in ADSL modem and a built-in analog modem) to a single telephone line in his home or office.

This situation has posed the problem that, in the case where a given ADSL modem starts data communication while another ADSL modem is in data communication, signals are superposed on the telephone line, with the result that the ADSL modems cannot perform the data communication.

On the other hand, a NCU (Network Control Unit) is built in the conventional analog modem for the switching circuit which requires the call control, and therefore the electrical insulation can be maintained in an on-hook state even when the telephone line is physically in a multi-point connection. The ADSL for which the call control is not required, however, has no NCU. In the case where a plurality of conventional ADSL modems are connected to a single telephone line, therefore, the impedance of $100\Omega$ cannot be maintained thereby making high-speed communication impossible.

SUMMARY OF THE INVENTION

In view of this problem, the object of the present invention is to provide an ADSL modem capable of realizing a stable high-speed data communication without signal superposition between ADSL modems or impedance mismatching even in the case where a plurality of ADSL modems are connected to a single telephone line in a SOHO application or in an ordinary user's home.

In order to achieve the object described above, according to a first aspect of the invention, there is provided an ADSL modem, connected to the telephone line, comprising a detector for detecting whether another ADSL modem connected to the telephone line is using the ADSL frequency band and a control unit for preventing the application of signal energy to the ADSL frequency band upon detection that another ADSL modem is using the ADSL frequency band.

As long as another ADSL modem is using the ADSL band, no signal energy is applied to the ADSL frequency band. Therefore, the ADSL signals are not superposed along the telephone line and a terminal impedance of $100\Omega$ can be maintained.

According to a second aspect of the invention, there is provided an ADSL modem wherein the detector includes a FFT demodulation unit for performing FFT demodulation of one carrier in the input signal from the telephone line, a normalization circuit for generating a normalized demodulation signal by normalizing the output signal of the FFT demodulation unit, a symbol delay buffer for generating a one-symbol delay signal delayed by one symbol behind the output signal of the normalization circuit, a complex conjugate unit for generating a complex conjugate of the output signal of the normalization circuit, a multiplier unit for multiplying the one-symbol delay signal with the complex conjugate and generating a difference signal, and a decision circuit for deciding that the ADSL band of the telephone line is occupied by another ADSL modem in the case where the difference signal remains not more than a predetermined threshold value for a period corresponding to a specific number of symbols.

In the case where the difference signal remains not more than a predetermined threshold for a predetermined number of symbols, it is decided that the particular signal is free of variations in both phase and frequency, and therefore it is decided that an ADSL signal and not noise has been received.

According to a third aspect of the invention, there is provided an ADSL modem in which the aforementioned one carrier in the input signal is preferably the 64th carrier corresponding to a predetermined tone in the ADSL frequency band.

The 64th carrier corresponds to the signal constantly continuing to produce the tone, and therefore by utilizing this carrier, it can be positively decided whether the ADSL band is occupied or not.

According to a fourth aspect of the invention, there is provided an ADSL modem in which the decision unit described above can preferably decide that the ADSL band of the telephone line is occupied by another ADSL modem upon detection of a prescribed number of periods, each period being defined as the state in which the phase component of the difference signal remains not more than a predetermined threshold value continuously for at least a specified number of symbols but not for a subsequent symbol.

As a result, it can be decided more positively that the ADSL band of the telephone line is occupied, for communication, by another ADSL modem.

According to a fifth aspect of the invention, there is provided an ADSL modem in which the specified number of symbols is preferably three.

The ITU-T G.992.2 Annex-C standard stipulates that the period free of the effect of the near-end crosstalk is three symbols, minimum, per period of noise, and therefore by utilizing this fact, it can be decided whether the ADSL band is occupied or not.

According to a sixth aspect of the invention, there is provided an ADSL modem wherein the control unit includes a line transformer connected to the telephone line and a terminal resistance switching circuit for switching the resistance value of the terminal resistor connected between the secondary of the line transformer and an ADSL signal transmission unit, the control unit further preferably including an impedance control unit by which a high impedance is maintained between the signal transmission unit and the secondary of the line transformer by controlling the terminal resistance switching circuit when the detector detects that the telephone line is occupied by another ADSL modem and a low impedance is maintained between the signal transmission unit and the secondary of the line transformer by controlling the terminal resistance switching circuit when the detector detects that the telephone line is not occupied by another ADSL modem.

In the case where the telephone line is occupied by another ADSL modem, a high impedance is maintained between the signal transmission unit and the secondary of the line transformer by the terminal resistance switching circuit, and therefore the superposition of the ADSL signals on the telephone line is positively prevented while at the same time positively keeping the terminal resistance at the impedance of 100Ω.

According to a seventh aspect of the invention, there is provided an ADSL modem wherein the detector decides whether another ADSL modem occupies the ADSL frequency band by an exchange of messages by polling other ADSL modems outside the ADSL band instead of detecting the signal in the ADSL band.

By message exchange, it can be decided, by direct inquiry, whether the ADSL band is occupied by another ADSL modem or not.

According to an eighth aspect of the invention, there is provided an ADSL modem wherein the message exchange by polling is preferably performed in the operating frequency band of an analog modem.

In the case where the ADSL modem has the function of an analog modem at the same time, the message exchange can be performed in the operating band of the analog modem.

According to a ninth aspect of the invention, there is provided an ADSL modem of the eighth aspect wherein the detector includes an analog modem, which in turn includes a 600Ω terminal circuit, a DC bypass circuit connected in parallel to the 600Ω terminal circuit, and a switch for turning off the DC bypass circuit in on-hook state and turning on the DC bypass circuit in off-hook state of the analog modem, the message exchange being preferably performed by polling using the audio band when the analog modem is in on-hook state.

In view of the fact that the message exchange is performed by polling using the audio band in the on-hook state of an analog modem, the call control is not carried out for the switching office even though messages are exchanged.

According to a tenth aspect of the invention, there is provided an ADSL modem wherein the message exchange by polling is carried out in the home phone line networking alliance band of an analog modem.

In the case where the ADSL modem has a communication function in the HomePNA band, the message exchange by polling is possible using the HomePNA band.

According to an 11th aspect of the invention, there is provided an ADSL modem wherein in the case where the ADSL band is occupied by another ADSL modem, the communication with other ADSL modems is performed in the home phone line networking alliance band, and the message received through the home phone line networking alliance band is multiplexed and sent out to the ADSL band.

Consequently, even in the case where the ADSL band is occupied by another ADSL modem, the communication is possible using the ADSL band without waiting until the end of the occupancy.

DESCRIPTION OF THE PREFERRED EMBODIMENTS

Figure 1:
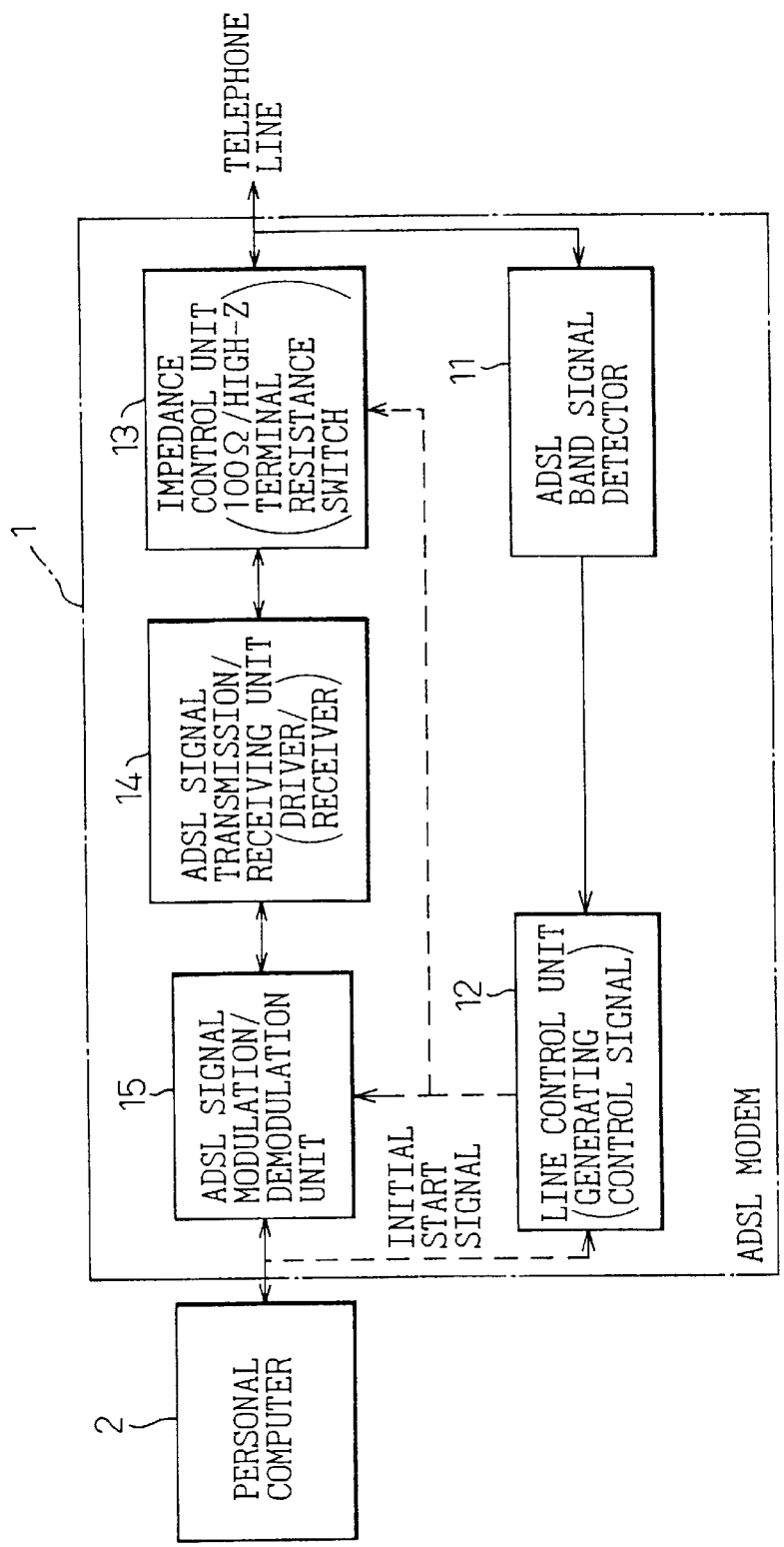
FIG. 1 is a block diagram showing a configuration of an ADSL modem according to an embodiment of the invention.

FIG. 1 is a block diagram showing a configuration of an ADSL modem according to an embodiment of the invention. In FIG. 1, an ADSL modem 1 is connected to a personal computer 2. Alternatively, the ADSL modem may be built in the personal computer 2.

The ADSL modem 1 comprises an ADSL band signal detector 11, a line control unit 12, an impedance control unit 13, an ADSL signal transmission/receiving unit 14, and an ADSL signal modulation/demodulation unit 15.

In operation, the ADSL band signal detector 11 constantly measures the frequency and intensity of the signal on the telephone line in order to determine whether the ADSL band is occupied by a signal from another ADSL model on the telephone line. Upon application of an initial start signal from the personal computer 2 to the line control unit 12, the line control unit 12 applies to the impedance control unit 13 and the ADSL signal modulation/demodulation unit 15 a control signal indicating whether the ADSL band is occupied by a signal from another ADSL modem on the telephone line.

The line control unit 12 generates a control signal indicating whether a signal from another ADSL modem on the telephone line has occupied the ADSL band, or not, in accordance with the initial start signal of the ADSL modem from the personal computer 2 and the output signal of the ADSL band signal detector 11.

In the case where the control signal from the line control unit 12 indicates the absence of a signal on the telephone line using the ADSL band from another ADSL modem, the impedance control unit 13 makes ADSL communication possible by setting the terminal resistance of the ADSL modem 1 to the standard impedance 100Ω for the analog modem. In the case where the control signal from the line control unit 12 indicates the presence of a signal on the telephone line using the ADSL band from another ADSL modem, on the other hand, the analog switch described later is turned off so that the terminal resistance of the ADSL modem 1 is increased to a high impedance to prevent the signal energy from being applied to the ADSL frequency band thereby to suppress the ADSL communication.

The ADSL signal transmission/receiving unit 14 includes a driver for transmitting a modulation signal from the ADSL signal modulation/demodulation unit 15 to the impedance control unit 13 and a receiver for delivering the receiving signal from the impedance control unit 13 to the ADSL signal modulation/demodulation unit 15.

In the case where the control signal from the line control unit 12 indicates the absence of a signal on the telephone line using the ADSL band from another ADSL modem, the ADSL signal modulation/demodulation unit 15 modulates and delivers the transmission signal from the personal computer 2 to the ADSL signal transmission/receiving unit 14 or demodulates and delivers the receiving signal from the ADSL signal transmission/receiving unit 14 to the personal computer 2. The ADSL signal modulation/demodulation unit 15 also produces a message indicating the impossibility of communication in accordance with the control signal from the line control unit 12 and applies it to the personal computer 2 in the case where the particular control signal indicates the presence on the telephone line of a signal using the ADSL band from another ADSL modem.

As described above, in the case where a signal from another ADSL modem using the ADSL band is present on the telephone line, the ADSL communication is inhibited thereby to avoid the superposition of the ADSL signals on the telephone line. Also, the problem can be avoided that the terminal resistance of 100Ω could not be maintained as a plurality of ADSL modems are connected to a single telephone line.

Figure 2:
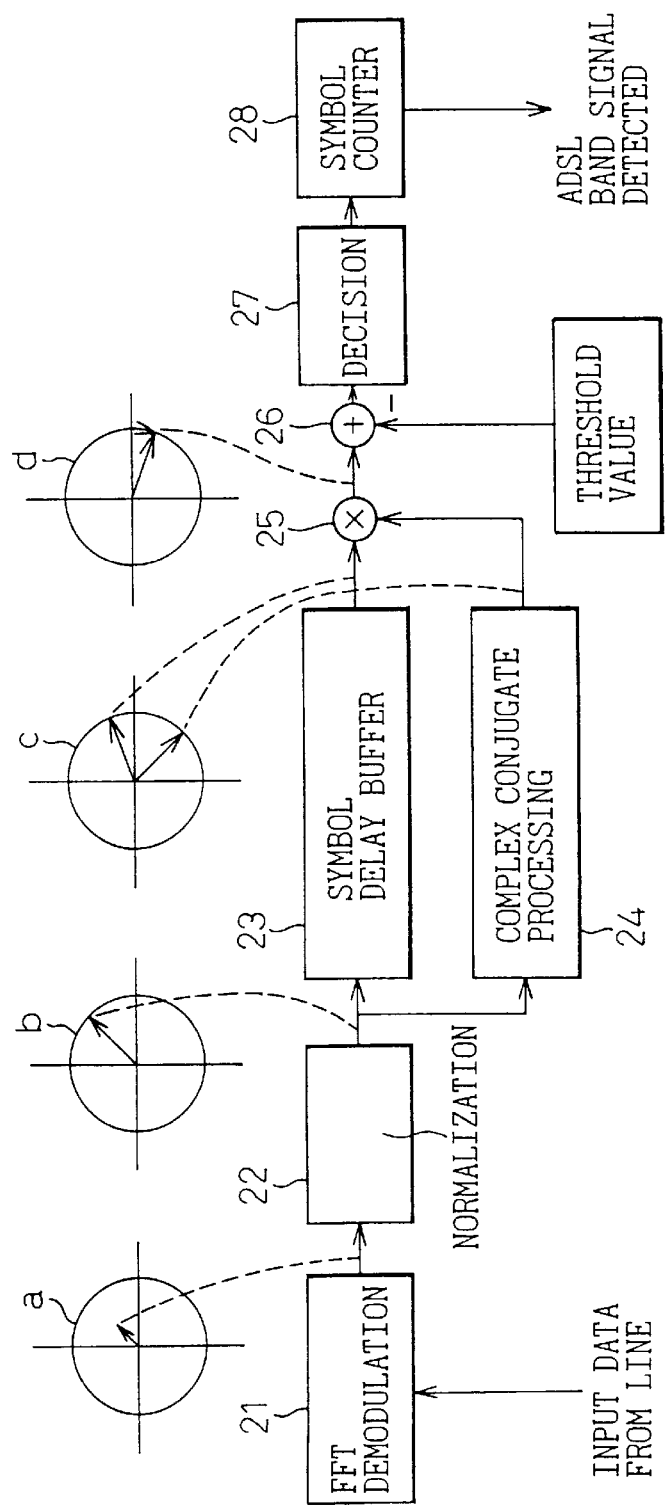
FIG. 2 is a block diagram showing an example configuration of an ADSL band signal detector 11 included in the system shown in FIG. 1.

FIG. 2 is a block diagram showing an example configuration of an ADSL band signal detector 11 included in the system shown in FIG. 1. In FIG. 2, numeral 21 designates a FFT demodulation unit, numeral 22 a normalization unit, numeral 23 a symbol delay buffer unit, numeral 24 a complex conjugate processing unit, numeral 25 a multiplier, numeral 26 an adder, numeral 27 a decision unit and numeral 28 a symbol counter.

Figure 3:
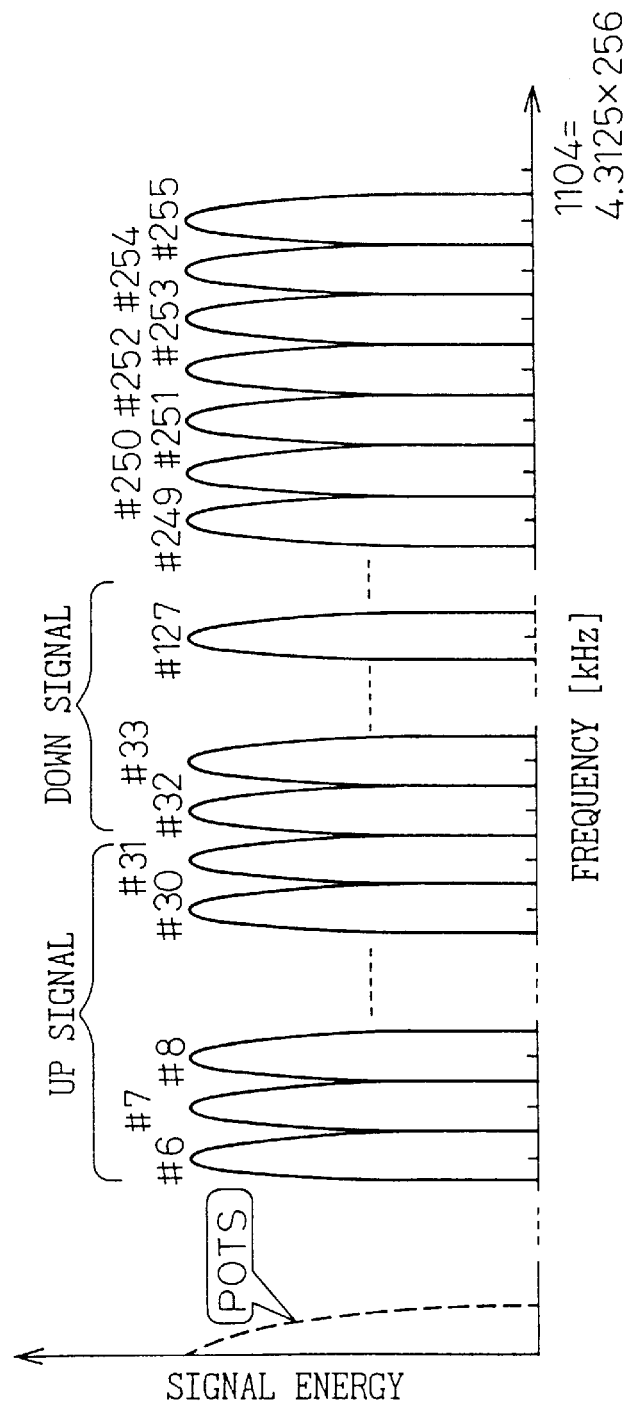
FIG. 3 is a waveform diagram showing the carrier signals contained in the ADSL signal.

FIG. 3 is a waveform diagram showing carrier signals contained in the ADSL signal. As shown in FIG. 3, the ADSL signal contains sixth to 31st carriers as up signals and 32nd to 127th carriers as down signals. The other carriers include 128th to 255th carriers. Among these carriers, the 64th carrier corresponds to the state in which a tone of a predetermined frequency, a predetermined phase and a predetermined amplitude continues to be produced. This embodiment, therefore, takes into consideration that the detection of the presence or absence of the 64th carrier is suitable for detecting the presence or absence of the ADSL signal on the telephone line.

The ADSL band signal detector 11 shown in FIG. 2 so operates that the input data from the telephone line is demodulated by the FFT demodulation unit 21 after A/D conversion. A frequency discriminator is also built in the FFT demodulation unit 21 for FFT demodulation of only the signal of the same frequency as the 64th carrier. The vector of the demodulation signal is shown in the vector diagram a of FIG. 2.

This demodulation signal is normalized in the normalization circuit 22 into a vector of radius 1 as shown in the vector diagram b of FIG. 2. A ROM for storing an inverse, a multiplier circuit, AGC circuit and the like are generally used as the normalization circuit 22.

The normalized signal is input to, and delayed one symbol by, a one-symbol delay buffer 23 while at the same time being subjected to the complex conjugate processing in the complex conjugate processing circuit 24. The outputs of the one-symbol delay buffer 23 and the complex conjugate processing circuit 24 are shown in the vector diagram c.

The outputs of the one-symbol delay buffer 23 and the complex conjugate processing circuit 24 are multiplied in the multiplier 25, thereby producing a difference signal between the symbols of the normalized demodulation signal. This difference signal, as shown in the vector diagram d, is a multiplication of normalized signals and therefore exists on the circle of radius 1.

The difference between the output of the multiplier 25 and a predetermined threshold level is calculated in the adder 26. The phase difference constituting the output of the adder 26 is applied to the decision unit 27 for deciding whether it is not more than a predetermined value. In the case where the phase difference is not more than the predetermined value, the input data is considered to be the tone representing the 64th carrier.

A symbol counter 28 counts the cases in which the phase difference output from the decision unit 27 is not more than a predetermined value.

In the case where the phase difference remains not more than a predetermined value continuously over a predetermined number of symbols based on the output from the symbol counter 28, it can be determined that the tone is detected, and therefore that the telephone line is occupied by another ADSL modem in data communication.

In Japanese telephone lines, periodic noises from an adjacent ISDN are sometimes superposed. According to the ITU-T G.992.2 Annex C standard, the time free of the effect of the near-end crosstalks covers only three symbols per one period of noise. In the event that a period during which three successive symbols with a sufficiently small phase difference is followed by six or seven symbols with a large phase difference is repeated not less than a predetermined number of times, therefore, it is decided that the ADSL tone is being received and that another ADSL modem is operating for data communication on the telephone line.

In the case where it is decided that data communication by another ADSL modem is occurring on the telephone line, an ADSL band signal detection signal is output from the symbol counter 28 and input to the line control unit 12 of the system shown in FIG. 1 thereby to generate a control signal. This control signal is supplied to the impedance control unit 13 and the ADSL signal modulation/demodulation unit 15.

Figure 4:
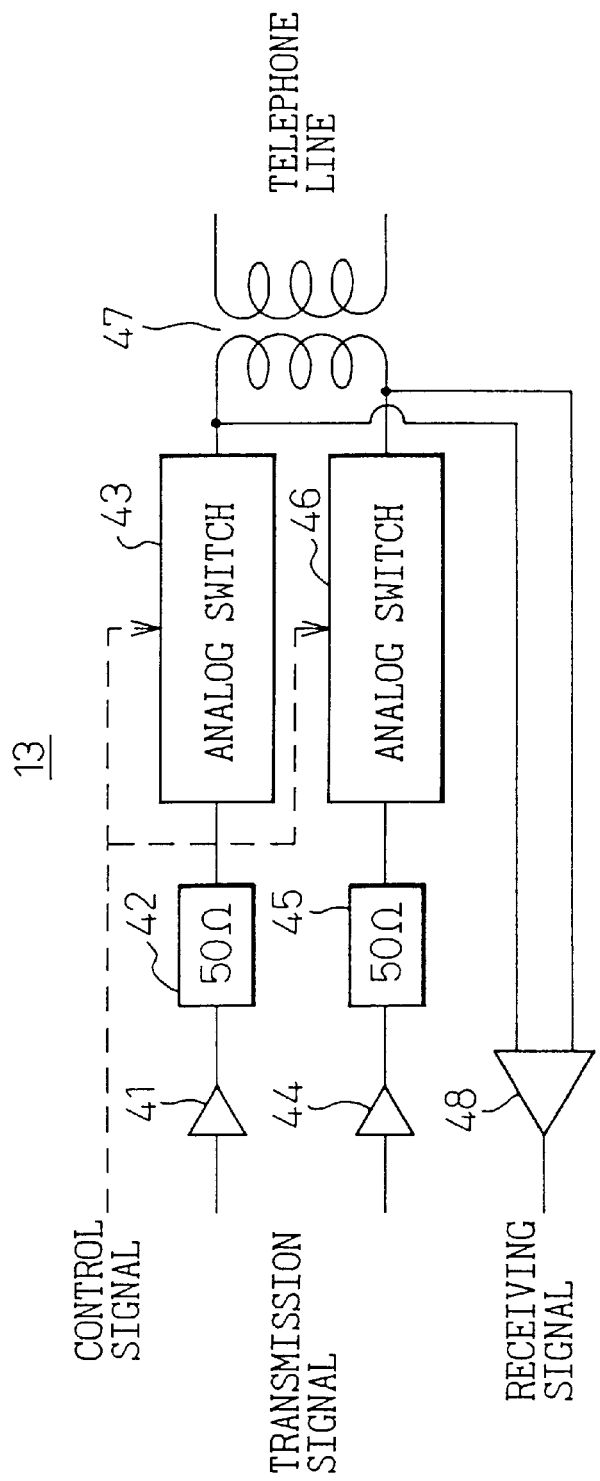
FIG. 4 is a circuit diagram showing a configuration of an impedance control unit 13 of the system shown in FIG. 1.

FIG. 4 is a circuit diagram showing a configuration of the impedance control unit 13 in the system shown in FIG. 1. In FIG. 4, the impedance control unit 13 includes 50Ω impedance 42, 45 for forming a terminal impedance of 100Ω, analog switches 43, 46, a transformer 47 and a receiving driver 48.

The impedance control unit 13 operates as described below. First, analog switches 43, 46 are turned off by the control signal from the line control unit 12. Thus, the terminal impedance of the ADSL modem is increased to a high level.

Upon detection by the ADSL band signal detector 11 that another ADSL modem is performing data communication on the telephone line, a message indicating that the communication is impossible is sent to the personal computer 2 through the ADSL modulation/demodulation unit 15 by the control signal from the line control unit 12. In this way, the superposition of the signals between a plurality of ADSL modems is avoided.

Upon detection by the ADSL band signal detector 11 that no another ADSL modem is performing data communication on the telephone line, on the other hand, the analog switches 43, 46 are turned on by the control signal from the line control unit 12. As a result, the ADSL modem assumes a terminal impedance of 100Ω, so that the ADSL communication is possible only when other ADSL modems are not using the telephone line.

According to another embodiment of the invention, whether the ADSL band is being used or not is decided not by the ADSL band signal detector 11 of FIG. 1 but by message exchange by polling with another ADSL modem in other than the ADSL band.

Figure 5:
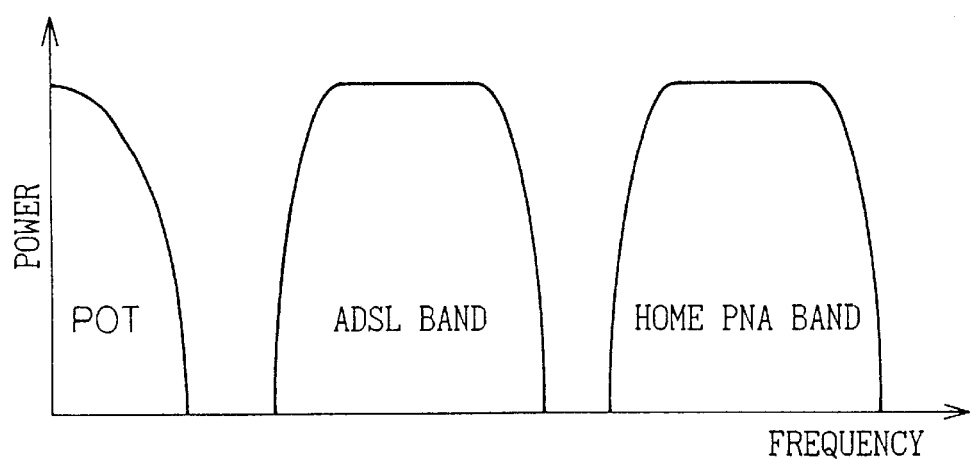
FIG. 5 is a diagram showing an example of another band than the ADSL band.

FIG. 5 is a diagram showing an example of such other bands. As shown in FIG. 5, bands other than the ADSL band include the POTS (Plain Old Telephone System) band and the HomePNA (Home Phone Line Networking Alliance) band used by the conventional analog modem.

As an example, the message exchange by polling is carried out in the POTS band which is an operating frequency band of the analog modem.

In performing the message exchange using the analog modem according to the prior art, however, the telephone line is turned off hook before message exchange, thereby leading to the problem that the switching office is subjected to the call control in spite of the desire to simply exchange messages with other modems.

Figure 6:
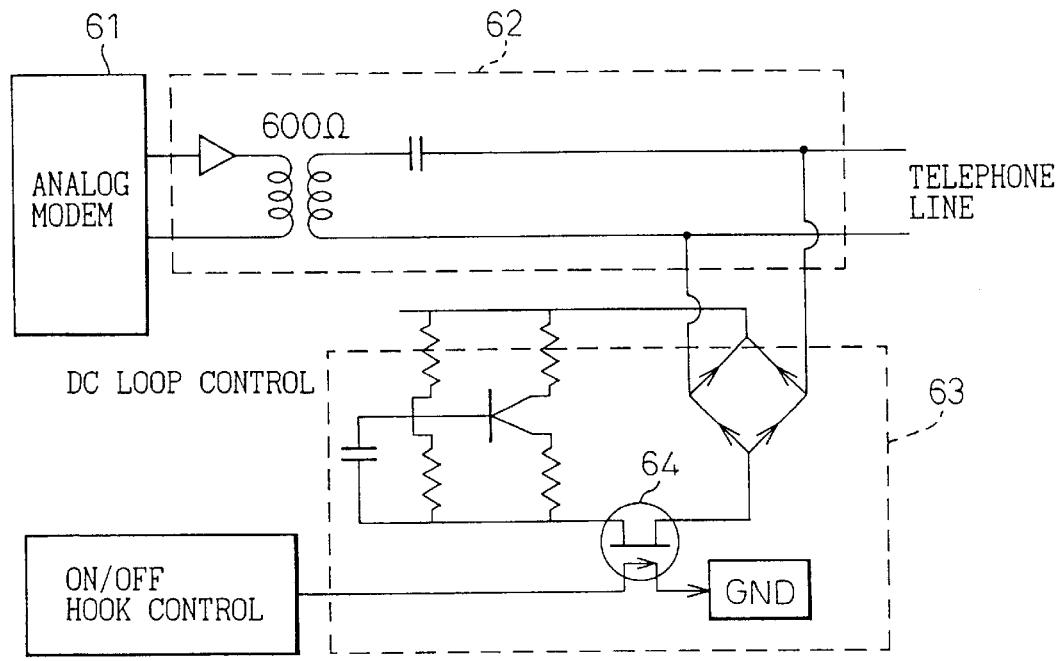
FIG. 6 is a circuit diagram showing a network control unit (NCU) of an analog modem according to another embodiment of the invention.

In order to solve this problem, according to an embodiment of the invention, there is proposed a network control unit (NCU) for the analog modem shown in FIG. 6.

In FIG. 6, the network control unit, in addition to the conventional analog modem configuration including an analog modem modulation/demodulation unit 61 and a 600Ω terminal circuit 62, includes a DC loop control circuit 63 connected in parallel to the 600Ω terminal circuit. The DC loop in the DC loop control circuit 63 includes a photo MOS relay 64. The 600Ω terminal circuit terminates the signal other than the DC component in the POTS band. The DC loop control circuit 63 terminates the DC component in the POTS band when the analog modem turns off hook.

In operation, when the analog modem turns on hook, an on/off hook control signal is set to ground level to turn off the photo MOS relay-64 and thus to prevent the formation of a DC loop. By using an analog modem in this state, the call control is prevented and therefore the message exchange between modems is possible without accessing the switching office. This message exchange is used to make inquiry as to whether the same telephone line is occupied by another ADSL modem or not.

When this analog modem is off hook, the photo MOS relay 64 is turned on with the on/off hook control signal set to the Vcc level thereby to form a DC loop. By using the analog modem in this state, the call control is effected so that the normal communication is carried out by accessing the switching office.

As another example, the message exchange by polling is effected in the HomePNA band (home phone line networking alliance band).

Figure 7:
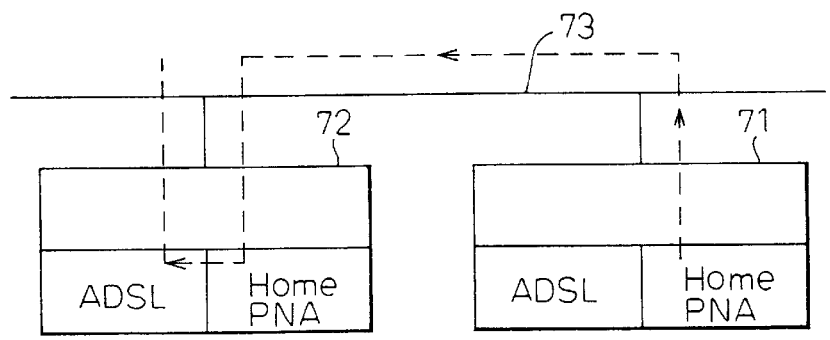
FIG. 7 is a diagram showing a configuration of the network according to another embodiment of the invention.

In this case, it is assumed that the ADSL band is occupied by another ADSL modem. The end of occupation of the ADSL band by another ADSL modem may be awaited. Alternatively, as shown in FIG. 7, without waiting for the end of use of the ADSL band, the communication with another ADSL modem may be carried out in the home phone line networking alliance band, and the contents received through the home phone line networking alliance band may be sent out to the ADSL band in multiplexed way by utilizing the routing function in the ADSL modem. More specifically, in the network shown in FIG. 7, assume that with personal computers 71 and 72 connected by the telephone line 73, the personal computer 72 occupying the ADSL band is detected by detecting the ADSL band or message exchange according to the embodiments described above. Then, the personal computer 71, without waiting for the end of the occupation of the ADSL band by the personal computer 72, transmits a signal to the personal computer 72 through the telephone line 73 using the HomePNA band, and the personal computer 72 converts the signal received from the personal computer 71 in the HomePNA band into a signal in the ADSL band using the routing function in the personal computer 72, and multiplexing it with the signal in the ADSL band in communication, transmits the resulting signal to the telephone line 73. In this way, the ADSL band on the telephone line can be efficiently used. In the first aspect of the invention, as long as the ADSL band is used by another ADSL modem, the signal energy is not applied to the ADSL frequency band, and therefore the ADSL signals are not superposed on each other along the telephone line and the terminal impedance is maintained at 100Ω.

In the second aspect of the invention, in the case where the state with the difference signal not more than a predetermined threshold value continues for a predetermined number of symbols, it is decided that this signal is free of variations in both phase and frequency and therefore it can be decided that an ADSL signal but not noise has been received.

In the third aspect of the invention, the 64th carrier is used for deciding whether the ADSL band is occupied or not. In this way, a positive decision is possible.

In the fourth aspect of the invention, it can be more positively decided that the ADSL band of the telephone line is occupied by another ADSL modem for communication.

In the fifth aspect of the invention, the ITU-T G.992.2 Annex-C standard stipulates that the period free of the effect of the near-end crosstalk is 3 symbols, minimum, per period of noise, and using this fact, whether the ADSL band is occupied or not can be positively decided.

In the sixth aspect of the invention, as long as the telephone line is occupied by another ADSL modem, a high impedance is maintained between the signal transmission unit and the secondary of the line transformer by the terminal resistance switching circuit, and therefore the suppression of the ADSL signals on the telephone line can be positively prevented while at the same time positively maintaining the terminal impedance at 100Ω.

In the seventh aspect of the invention, it can be decided by direct inquiry through message exchange whether the ADSL band is occupied by another ADSL modem or not.

In the eighth aspect of the invention the message exchange can be carried out in the operating band of an analog modem in the case where the ADSL modem has the function of the analog modem at the same time.

In the ninth aspect of the invention, the message exchange is effected by polling using the audio band when the analog modem is on hook, and therefore the switching office is not subjected to the call control by the message exchange.

In the tenth aspect of the invention, in the case where the ADSL modem has the communication function in the HomePNA band, the message exchange by polling is possible using the HomePNA band.

In the 11th aspect of the invention, even in the case where the ADSL band is occupied by another ADSL modem, the communication using the ADSL band is possible without waiting for the end of the occupation of the ADSL band by another ADSL modem.

What is claimed is:

1. An ADSL modem connected to a telephone line, comprising a detector for detecting whether another ADSL modem connected to the telephone line is using the ADSL frequency band and a control unit for suppressing the application of the signal energy to the ADSL frequency band upon detection that another ADSL modem is using the ADSL frequency band;

wherein said detector includes a FFT demodulation unit for carrying out the FFT demodulation of one carrier in the input signal from the telephone line, a normalization circuit for generating a normalized demodulation signal by normalizing the output signal of the FFT demodulation unit, a symbol delay buffer for generating a one-symbol delay signal delayed one symbol behind the output signal of the normalization circuit, a complex conjugate unit for generating a complex conjugate of the output signal of the normalization circuit, a multiplier unit for multiplying the one-symbol delay signal with the complex conjugate and generating a difference signal, and a decision circuit for deciding that the ADSL band of the telephone line is occupied by another ADSL modem for communication in the case where the difference signal remains not more than a predetermined threshold value for a period corresponding to a specific number of symbols.

2. An ADSL modem according claim 1, in which one of the carriers in said input signal is preferably the 64th carrier in the ADSL frequency band.

3. An ADSL modem according to claim 1, in which said decision unit preferably decides that the ADSL band of the telephone line is occupied by another ADSL modem for communication upon detection of a predetermined number of periods, each period being defined as the state in which the phase component of the difference signal remains not more than a predetermined threshold value continuously for at least a specified number of symbols but not for at least a subsequent symbol.

4. An ADSL modem according to claim 3, in which the specified number of symbols is three.

5. An ADSL modem according to claim 1, wherein the control unit includes a line transformer connected to the telephone line and a terminal resistance switching circuit for switching the resistance value of the terminal resistor connected between the secondary of the line transformer and an ADSL signal transmission unit, the control unit further including an impedance control unit in which a high impedance is maintained between said signal transmission unit and the secondary of the line transformer by controlling the terminal resistance switching circuit while the detector detects that the telephone line is occupied by another ADSL modem and a low impedance is maintained between said signal transmission unit and the secondary of the line transformer by controlling the terminal resistance switching circuit while the detector detects that the telephone line is not occupied by another ADSL modem.

6. An ADSL modem according to claim 1, wherein the detector decides whether another ADSL modem occupies the ADSL frequency band, by exchange of messages by polling with said another ADSL modem outside the ADSL band.

7. An ADSL modem according to claim 6, wherein the message exchange by polling is performed in the operating frequency band of an analog modem.

8. An ADSL modem according to claim 7, wherein the detector includes an analog modem, which in turn includes a 600Ω terminal circuit, a DC bypass circuit connected in parallel to the 600Ω terminal circuit, and a switch for turning off the DC bypass circuit with the analog modem on hook and turning on the DC bypass circuit in off-hook state, the message exchange being performed by polling using the audio band with the analog modem on hook.

9. An ADSL modem according to claim 6, wherein the message exchange by polling is carried out in the home phone line networking alliance band of an analog modem.

10. An ADSL modem according to claim 1, wherein in the case where the ADSL band is occupied by another ADSL modem, the communication with said another ADSL modem is performed in the home phone line networking alliance band, and the message received through the home phone line networking alliance band is multiplexed and sent out to the ADSL band.

* * * * *